United States Patent
Heninger et al.

[11] Patent Number: 6,035,997
[45] Date of Patent: Mar. 14, 2000

[54] CONVEYOR PAN COUPLING ASSEMBLY

[75] Inventors: Dennis L. Heninger, Chilhowie; Clarence L. Bandy, Jr., Glade Spring, both of Va.

[73] Assignee: Longwall-Associates, Inc., Chilhowie, Va.

[21] Appl. No.: 09/039,761

[22] Filed: Mar. 16, 1998

[51] Int. Cl.[7] .............................. B65G 19/18; B65G 21/00
[52] U.S. Cl. ................................. 198/735.2; 198/735.6; 198/860.2; 198/860.6
[58] Field of Search ........................... 198/735.02, 735.6, 198/860.2, 860.6

[56] References Cited

U.S. PATENT DOCUMENTS

| | | | |
|---|---|---|---|
| 3,583,552 | 6/1971 | Renwick | 198/195 |
| 3,946,860 | 3/1976 | Krohm et al. . | |
| 3,986,600 | 10/1976 | Pentith . | |
| 3,999,651 | 12/1976 | Steinkuhl . | |
| 4,098,396 | 7/1978 | Stoppani et al. . | |
| 4,133,424 | 1/1979 | Sabes . | |
| 4,134,489 | 1/1979 | Sabes . | |
| 4,157,751 | 6/1979 | Grundken et al. | 198/735 |
| 4,420,075 | 12/1983 | Skolik et al. . | |
| 4,607,890 | 8/1986 | Merten et al. . | |
| 4,646,905 | 3/1987 | Grundken et al. . | |
| 4,733,771 | 3/1988 | Grundken et al. . | |
| 4,813,747 | 3/1989 | Klimeck et al. . | |
| 5,033,604 | 7/1991 | Steinkuhl et al. . | |
| 5,131,724 | 7/1992 | Bandy, Jr. et al. . | |
| 5,224,582 | 7/1993 | Hahn et al. . | |
| 5,287,955 | 2/1994 | Steinkuhl et al. . | |
| 5,658,085 | 8/1997 | Merten et al. . | |

Primary Examiner—William E. Terrell
Assistant Examiner—Kenneth W Bower
Attorney, Agent, or Firm—King and Schickli

[57] ABSTRACT

An improved coupler assembly for pans in a longwall mining conveyor system for handling coal or the like is provided. The assembly includes a dog-bone coupler having notched ends. A first end of the coupler is received and secured in place by a stop in a first recess formed in one conveyor pan. A cooperating second recess in the mating pan receives the opposite or second end of the coupler. A T-shaped retainer includes a crosspiece which is pivotally received in upper and lower retention holes formed in the second recess to engage the second end. The retainer rotates such that the leg of the T that projects outwardly therefrom is received in a slot that includes opposed resilient inserts for holding the leg and, thus, the retainer, securely in place.

10 Claims, 4 Drawing Sheets

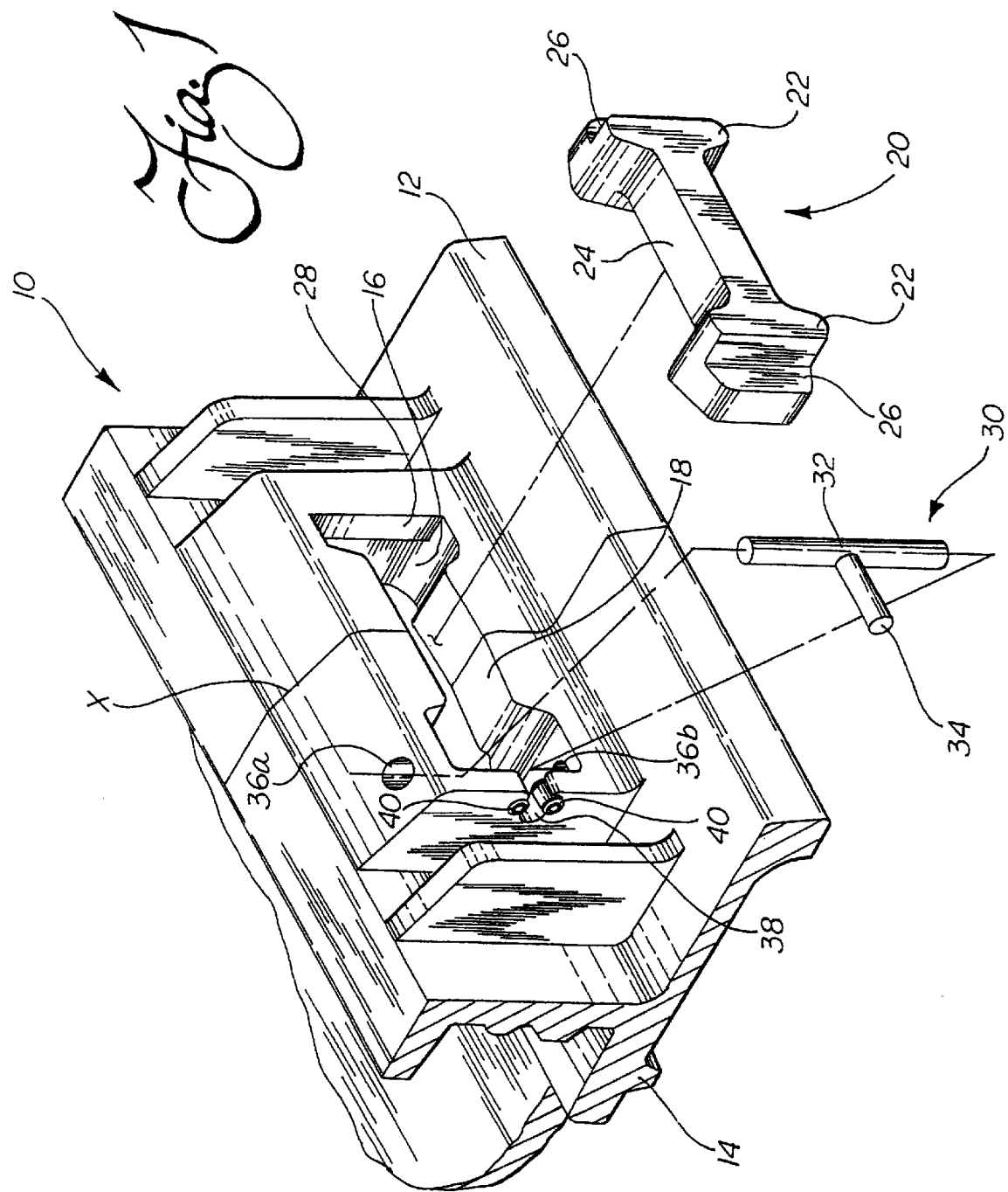

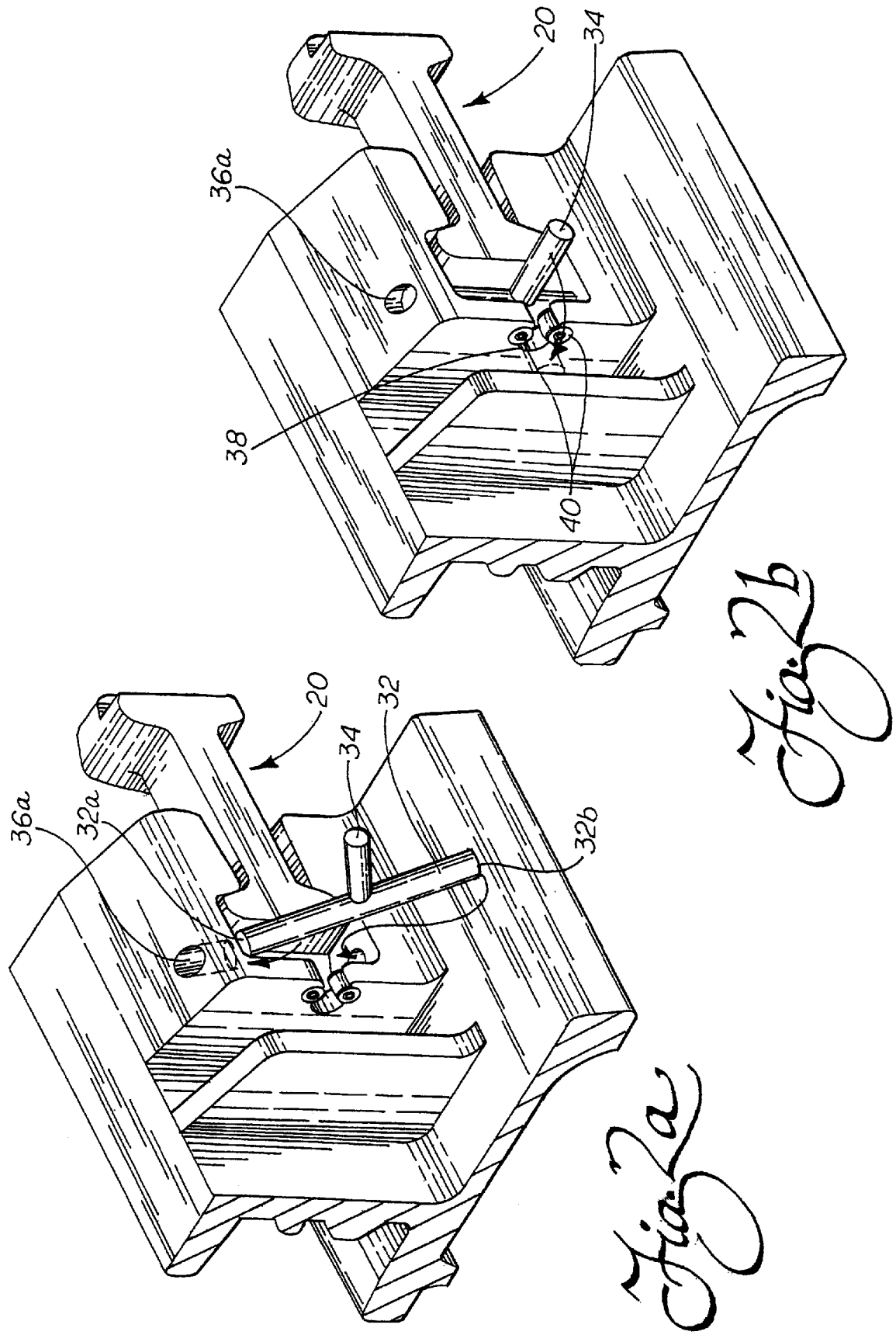

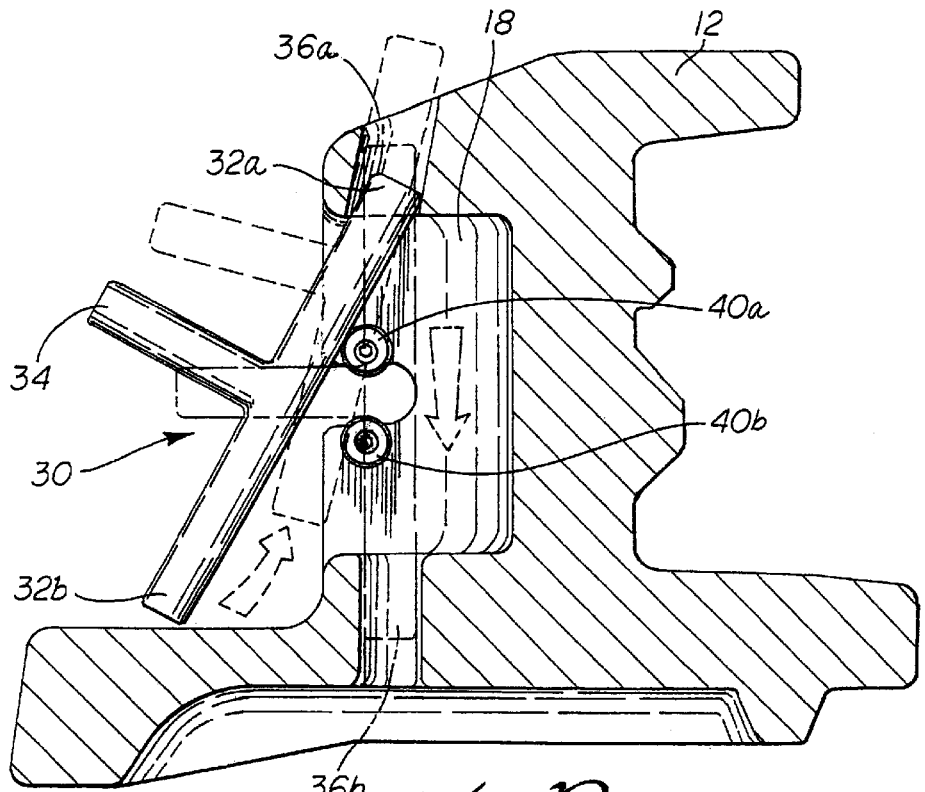
Fig. 2c
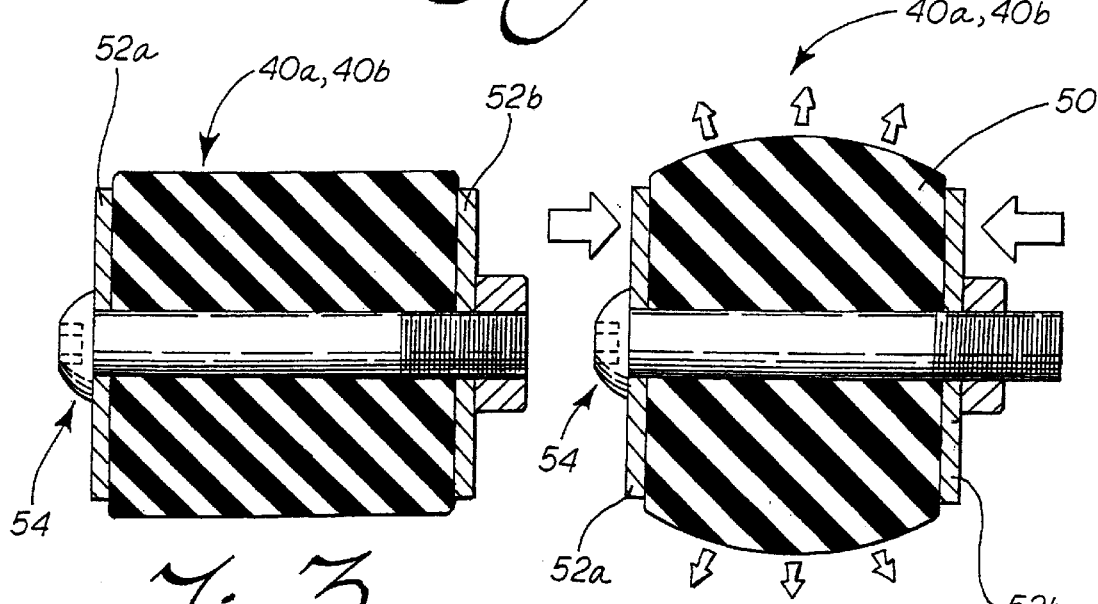
Fig. 3a
Fig. 3b

CONVEYOR PAN COUPLING ASSEMBLY

TECHNICAL FIELD

The present invention relates generally to the field of conveyors and, more particularly, to an improved assembly for coupling conveyor pans in an armored face conveyor system, such as is used for handling coal or the like in a longwall mining system.

BACKGROUND OF THE INVENTION

In longwall mining, a plurality of conveyor pans are connected in an end-to-end, modular relationship for handling the mined minerals, such as coal. In addition to receiving the mineral as it is won for conveying away from the face, the mating pans also serve as a guide track for the haulage apparatus of the mining machine or shearer as it reciprocates back and forth.

To provide an efficient and effective conveyor system, the mating pans must interconnect in such a way as to withstand the substantial forces present during a typical mining operation, such as those created by the above-described motion of the mining machine. More specifically, the connection must resist tensile forces to prevent the pans from separating, while permitting a limited amount of up-and-down or toggling movement between mating pans to accommodate different mining conditions encountered, such as inevitable variations in the mine floor.

It is common in the art to use a releasable coupler placed between mating pans to provide this function. One of the most common couplers has an elongated shank and opposed enlarged ends, thus forming a dog bone shape. The coupler is retained in similarly shaped first and second recesses which cooperate between the mating pans. This arrangement allows the desirable up-and-down movement, while resisting the large tensile forces tending to cause pan separation.

In addition to the above-described tensile force, the mating pans are also subjected to significant vibrations during the mining operation. If not properly secured in place, jarring of the coupler caused by these vibrations can cause forceful ejection from the recesses. Of course, this allows the mating pans to separate and results in a conveyor system failure.

Thus, as should be appreciated from the above discussion, there is a recognized need to securely hold the dog bone type coupler in the recesses to prevent the deleterious downtime of the conveyor system. However, a competing need is ease of installation and removal. This is important for efficiently setting up or taking down the conveyor system, or adding or subtracting individual pans, as may be required during a particular mining operation.

Previously, others have proposed a number of solutions in an attempt to simultaneously meet both of these needs. Typical designs include pivoting one end of the coupler into a cavity formed in the first recess, thus providing a fixed first end. The second end swings free into the second recess, and a separate, removable I-plate is used to retain and lock it in place. In some prior art arrangements, these I-plates are wedge shaped to try to help hold the coupler in place. Because these plates still tend to fall out due to vibration, some designs also include a tethered R-clip or pin that is used to extend through mating apertures in the pan and the plate for locking. In later designs, the plates are permanently pivoted on a pin transverse to the longitudinal axis of the coupler and may or may not be securely locked in place. Examples of such proposals are found in U.S. Pat. No. 5,658,085 to Merten et al., issued Aug. 19, 1997, U.S. Pat. No. 5,287,955 to Steinkuhl et al., issued Feb. 22, 1994, and U.S. Pat. No. 4,733,771 to Gründken et al., issued Mar. 29, 1988.

While these designs offer some improvement in securing the coupler in the recesses, limitations remain. First of all, ease of coupler installation/removal is generally lacking. For instance, the need for a plate to be pivotally mounted on a pin leads to the disadvantage that the I-plates tend to jam due to debris and coal fines collecting in the exposed end of the recess. The operators, especially under time limitations to meet quotas, tend to try to force the plate into position bending or skewing the mounting pin and/or plate. In addition, a separate locking pin on the plate that is required to hold the plate in place complicates the process even more since it is typically very small and hard to manipulate. Another disadvantage is that in some instances, a special tool is even required to manipulate the pin to lock or unlock the plate. Moreover, even with a tool, it must be realized that conditions on the mine floor simply do not permit a worker to easily and efficiently complete such a pinned connection. Thus, pan installation/removal time and maintenance costs are substantially increased when these prior art arrangements have to be used.

Furthermore, in each of these designs, since the retaining I-plate is permanently attached, it is not easily replaceable when it becomes damaged. In addition to possible abuse by the operators in trying to overcome a jammed plate, repeated tension loading, vibration, and locking/unlocking creates deleterious wear on the plate and/or the two pins, thereby substantially reducing the locking integrity of the conveyor system. As the debris and fines of the minerals work into the cervices, not only is jamming a problem, but the abrasive effect serves to accelerate the wearing of these parts, especially the pivot connection. Eventually it is necessary to make radical repairs, such as drilling and replacement of the I-plate/mounting/locking pin assembly. Also, these prior art I-plate assemblies, in order to properly perform the retaining function, must be reworked to close tolerances since the feature of being permanently attached to the pan does not provide any leeway when they are being locked or unlocked against the coupler. Of course, these shortcomings further increase maintenance costs and may lead to significant production downtime.

Thus, a need is identified for an improved, simplified coupling assembly that interconnects conveyor pans placed in an end-to-end relationship for use in a longwall mining conveyor system. The coupling assembly would securely hold the pans together such that tensile forces are resisted, while permitting a limited amount of up-and-down movement between mating pans to accommodate varying mine conditions. In addition, installation of the coupling assembly would be simple, thereby easy assembly/disassembly is accomplished, allowing pans to be easily and efficiently added to or taken away from the system. Further, the assembly would be long-lasting and would utilize a minimum number of components that are easy to manipulate, can be adjusted and are relatively inexpensive to fabricate.

SUMMARY OF THE INVENTION

Therefore, keeping the above needs in focus, it is a primary object of the present invention to provide an assembly for coupling mating conveyor pans that overcomes the above-described limitations and disadvantages of the prior art.

An additional object is to provide such a coupling assembly that resists tensile forces between mating pans, while permitting a limited amount of relative up-and-down movement to accommodate variations in mine floor conditions.

Still another object is to provide a coupling assembly that is simple to install or remove, is not subject to jamming or significant wear, and therefore allows more efficient use of the conveyor system.

Yet another object is to provide a coupling assembly that is long-lasting, inexpensive to manufacture, and easy to maintain and replace if necessary.

Still another object of the invention is to provide a coupling assembly and method that utilizes a simple T-rod where the cross piece extends across the free end of the coupler with a simple up/down tilting movement into spaced apertures for coupler retention, and the leg of the T-rod is then snapped into a resilient slot for locking by a simple rotary motion.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved coupling assembly is provided for interconnecting mating conveyor pans of the type that are typically used for handling coal or the like in a longwall mining system. The coupling assembly of the invention includes a coupler that is installed in first and second cooperating recesses formed in adjacent ends of the pans when placed in an end-to-end relationship. The coupler is formed with opposed enlarged ends and an elongated shank, thereby providing a dog bone shape. As should be appreciated, these recesses generally follow the outline of the coupler, but incorporate additional clearance space to allow the coupler to the up and down in the vertical plane. This permits the desirable toggle movement between mating pans. The dimensions of the recesses are such that the enlarged ends of the coupler abut the inner edges thereof to prevent any pan separation from occurring.

In accordance with the broadest aspects of the invention, a first end of the coupler is held in place by a stop formed by a cavity in a first recess and a T-shaped retainer or T-rod is releasably secured in the second, opposite recess to retain and lock the second end. The retainer includes an upstanding crosspiece and a leg projecting outwardly therefrom. To install the coupler, the first end is inserted inwardly into the first recess to abut against the stop. The second end then swings into the second recess. The retainer is extended across this end of the coupler by up and down and pivoting movement of the crosspiece into opposed holes in the upper and lower faces of the recess. The retainer is then rotated such that the leg is releasably locked in place in a slot adjacent the edge of the recess. The combination of the permanent stop and the retainer serve to securely hold the coupler in the recesses. In addition, the coupler may be removed from this position with little effort by simply reversing the simple rotation/pivoting motions of the retainer. Thus, the coupler is easy to install/remove, securely held in place in the recesses, and serves to interconnect the pans while allowing the desirable up-and-down relative motion.

More specifically describing the coupler, a notch is formed in the outer portion of both enlarged ends. The first notched end rests against the stop formed by the cavity in the distal end of the first recess. This locks the end in place by the simple, pivotal insertion action. The other or second notched end provides a surface for abutting the crosspiece of the retainer. Ideally, the coupler is symmetrical and thus, may be rotated 180° while retaining full functionality. This, of course, improves ease of installation, as an operator need not guess which end of the coupler fits in either the first or second recess, respectively.

In the preferred embodiment, the retainer is formed by a fabricated T-rod. As the crosspiece is held upright to be inserted into the upper retention hole, the projecting leg provides a convenient gripping handle. This upper retention hole is preferably open-ended to allow the crosspiece to move vertically therethrough until the lower end of the crosspiece clears the edge of the recess and can be urged inwardly. Upon alignment with the lower retention hole, the lower part of the crosspiece is seated therein such that it extends across the adjacent notched end of the coupler. In this position, the crosspiece is securely held in the retention holes and against the notched end of coupler, but is capable of rotating about its upstanding or vertical axis.

To ensure that the crosspiece remains in place in the retention holes to hold the coupler in place, the leg of the T-rod is rotated toward an open, but restricted slot formed in the distal end of this second recess. Opposed upper and lower resilient inserts disposed in the slot serve to trap and lock the leg therein. More specifically, upon entering the slot, the leg is forced inwardly such that it deforms the resilient inserts and passes therethrough with a snap action. As should be appreciated, the leg cannot independently cause the required deformation of the resilient inserts to exit the slot. As the leg is bounded and locked on all sides the crosspiece is restricted from upward or downward movement in response to vibrations or jarring. This ensures that the retainer remains captured in the second recess and holds firmly against the face of the adjacent end of the coupler. This action, along with the engagement of the first end against the fixed stop in the first recess, combines to securely hold the coupler in place.

It should be appreciated that in this locked position, the end of the leg preferably extends outwardly from the side of the restricted slot and is, thus, readily accessible to be used as a handle by the operator. To remove the retainer, the leg is thus simply grasped and forced against the resilient inserts, which deform to allow the leg to pass back through the mouth of the slot. Still gripping the leg, the crosspiece is urged upwardly until it extends through the open end of the upper retention hole. This releases the crosspiece from its seated position in the lower retention hole. The crosspiece can then be pivoted angularly outwardly for removal from the upper retention hole, and thence the recess. The coupler can now be moved out of the second recess, and by outwardly swinging action, the second end released from behind the stop in the first recess.

Thus, as should now be appreciated, the retainer is simple in design and highly reliable in its retention capability with respect to the coupler. The T-rod structure of the retainer also lends itself to being easy to install and remove, thereby advantageously allowing easy access to the coupler for setting up or taking down the conveyor system, or adding/subtracting individual pans, as may be required during a particular mining operation.

In accordance with another aspect of the present invention, the resilient inserts are cylindrical in shape and selectively adjustable to provide a greater holding force/ frictional resistance for trapping the leg. More specifically, washers disposed on either side of the insert are secured together by a bolt and nut combination forming a compression adjustment means. Preferably, the inserts fit in opposed C-shaped sockets integrally formed in the upper and lower edges of the restricted slot.

As will be apparent, the adjustment means is selectively operable to pull the washers together in order to apply a compressive force to the resilient insert. This force causes the insert to expand radially in the socket and, thus secures it therein. Advantageously, the manufacturer can thus control at the factory the expansion of the insert to compensate for slight differences in the dimensions of the integrally formed sockets, such as those caused by casting tolerances or the like. It can be realized that during this adjustment, the exposed segment of the insert bulges through the opening provided by the C-shaped socket just the right amount. The rounded bulges of these opposed inserts form the boundary which allows the snap action entry, and then prevents the leg from inadvertently exiting the slot once it is engaged therein, as described above. Also, once set at the factory, no further initial adjustment is needed by the operator in the mine.

As should now be appreciated, the compressive force may be easily changed later in the mine to either increase or decrease the holding capabilities of the inserts; that is, the amount of the insert which bulges through the C-shaped socket can be fine tuned to fit the particular application. As the inserts wear, an increase in the compressive force can be used to advantageously expand the insert to enhance the bulge to maintain the desired holding function. Also, as should be appreciated, the inserts are easily removed for replacement, if necessary, by simply using the adjustment means to relieve the compressive force and sliding the insert from the socket edge.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serves to explain the principles of the invention. In the drawings:

FIG. 1 is a perspective, cutaway view of mating pans of a conveyor system, showing an exploded view of the coupling assembly of the present invention, including the dog bone shaped coupler, the stop formed in a first recess for holding an end of the coupler, and the T-shaped retainer for placement in a second recess for holding the opposite end of the coupler in place;

FIGS. 2a and 2b are perspective views showing the progression of the insertion of the T-shaped retainer into the second recess in the conveyor pan such that it spans across an end of the coupler and holds it therein;

FIG. 2c is a cross-sectional view at 90° rotation from the views of FIGS. 2a and 2b, showing the progression of the installation of the retainer from a different perspective;

FIG. 3a is a cross-sectional view of a resilient insert that is housed in the edge of the lateral slot for forming the snap action detent to hold the retainer in place;

FIG. 3b is a similar cross-sectional view showing the compression of the insert by adjustment means to cause it to expand outwardly;

Figure 4A:
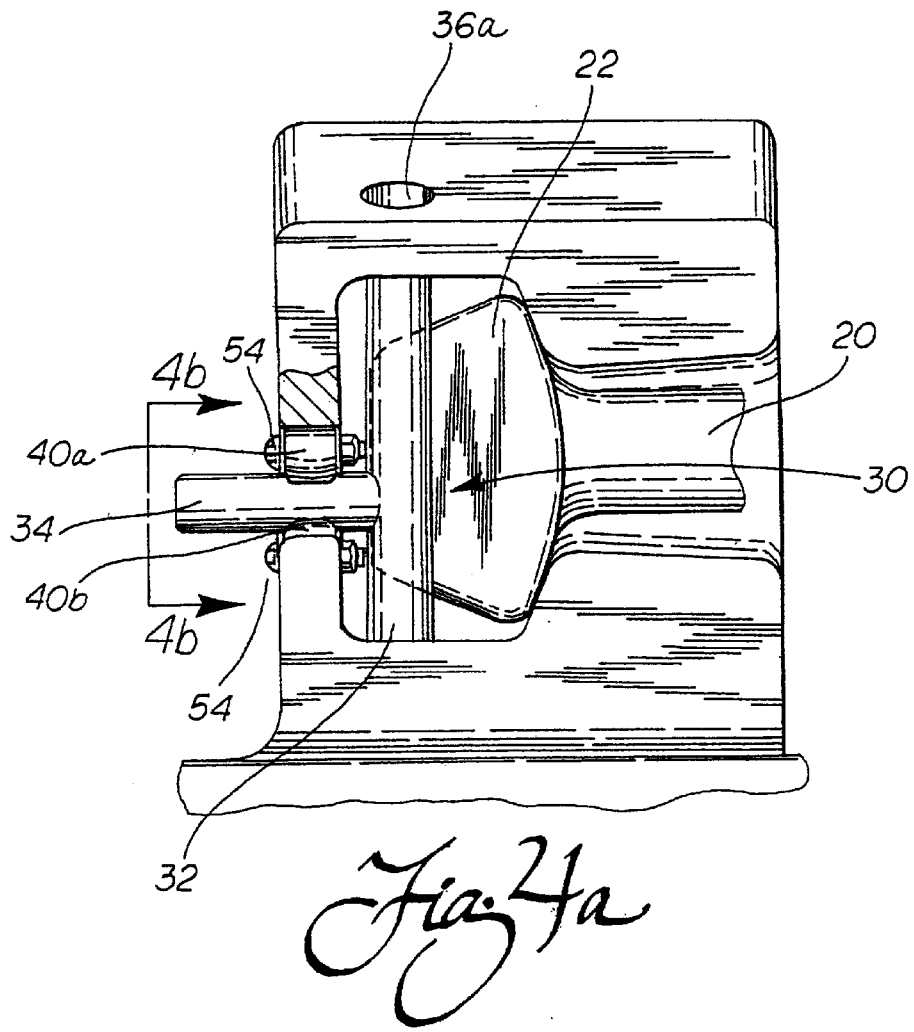
FIG. 4a is a front cutaway view showing the retainers secured in place with a cutaway view of the upper edge of slot.

Reference will now be made in detail to the present preferred embodiment of the invention, an example of which is illustrated in the accompanying drawings.

DETAILED DESCRIPTION OF THE INVENTION

Reference is now made to FIG. 1 illustrating the coupling assembly 10 of the present invention. As will become apparent after reviewing the description below, the improved coupler assembly 10 serves to securely hold mating conveyor pans 12, 14. It is also characterized by simplicity and the ease by which an operator can install/remove it, thereby allowing for the conveyor system to be efficiently set up or taken down, or individual pans added or removed, as required by a particular mining operation.

The assembly 10 is provided for interconnecting mating conveyor pans 12, 14 of the type that are typically used for handling coal or the like in a longwall mining system. These pans 12, 14 generally have a deck plate supported by parallel, sigma-shaped side sections to define a feed path, such as is shown in U.S. Pat. No. 5,131,724 to Bandy, Jr., owned by the assignee of the present invention. In FIGS. 1, 2a and 2b are shown with the sigma side sections cutaway for simplicity. In reality, the cross section hatching denotes a straight cut through the sigma side section that extends along the length of each conveyor module.

In the preferred embodiment, first and second recesses 16, 18 are formed along the outside of the side sections of each pan 12, 14, respectively. The recesses 16, 18 cooperate when the pans 12, 14 are placed in an end-to-end relationship, as is shown by the mating line X in FIG. 1. Although only one side of the mating of two pans 12, 14 is shown in FIG. 1, it should be appreciated that a similar arrangement is preferably included on the opposite side of the pans.

A coupler 20 installed in the recesses 16, 18 serves to interconnect the pans. The coupler 20 is of the dog bone type, thus having opposed enlarged and flared ends 22 and an elongated shank 24. The front distal portion of each enlarged end 20 is indented to form a notch 26. As should be appreciated from viewing FIG. 1, the above-described shape dictates that the coupler 18 is symmetrical about a center vertical axis and, thus may be rotated 180° while retaining its ability to fit in the recesses 16, 18.

The recesses 16, 18 are contoured generally to follow the outline of the coupler 20, but to permit the desired up-and-down or toggling movement between the mating pans 12, 14, additional clearance space is provided. This allows the coupler 20 to move in the vertical plane (FIG. 4a) to allow snaking of the conveyor system along the uneven mine floor. The combined length of the recesses 16, 18 relative to the length of the coupler 20 is such that the flared ends 22 abut the depending inner edges formed in each respective recess 16, 18. Thus, any longitudinal separation between the pans 12, 14 is advantageously prevented.

To secure and hold coupler 20 in place, a stop 28 is formed in the distal end of the first recess 16 and a fabricated T-shaped retainer or T-rod 30 is releasably secured in the second, opposite recess 18. The stop 28 is integrally formed in the conveyor pan 14 and extends along the outer edge of the recess to form a cavity therein that corresponds to the shape of the notch 26. Once the first end is in place, the coupler can swing into its second recess 18. The retainer 30 includes an upstanding crosspiece 32 and a leg 34 which projects outwardly therefrom. As is described more fully below, to hold this second end of the coupler 20 in place, the retainer 30 is pivotally inserted into opposed retention holes 36a, 36b formed in the upper and lower faces of the recess 18, and into a restricted lateral slot 38 also formed therein.

Thus, to install the coupler 20, one end 22 is pivoted inwardly into the first recess 16 such that notch 26 firmly rests against the stop 28. Of course, the above-described symmetry provided by the dog bone shape allows either end 22 of the coupler 20 to be selected. The second end of coupler 20 then swings around until it rests in recess 18.

As is best shown in the progression of FIGS. 2a and 2b, as well as FIG. 2c, to securely retain the coupler 20, the crosspiece 32 of retainer 30 is then pivotally installed into the second recess 18. More specifically, the upper end 32a of the crosspiece 32 is pivoted and lifted into upper retention hole 36a (see upper action arrow in FIG. 2a and lower, phantom action arrow in FIG. 2c) using the projecting leg 34 as a grasping handle. This retention hole 36a is open-ended to allow the crosspiece 32 to pass vertically therethrough until the lower end 32b of the crosspiece 32 clears the bottom edge of the recess 18 and can be urged inwardly (see downward phantom action arrow in FIG. 2c). Upon alignment with the lower retention hole 36b, the crosspiece 32 is thereby firmly seated. It extends across the adjacent notched end 26 of the coupler 20 (see FIG. 4a). In other words, in this position, the crosspiece 32 is securely held in the retention holes 36a, 36b such that coupler 20 is captured in the recess 18. Although fixed in place in retention holes 36a, 36b, the crosspiece 32 is free to rotate therein.

To ensure that the crosspiece 32 remains in place, the leg 34 is grasped and rotated into the open mouth of restricted slot 38 formed in the distal end of the recess 18 (see action arrow in FIG. 2b). C-shaped sockets 42a, 42b integrally formed in the top and bottom edges of the slot 38 mount opposed upper and lower resilient inserts 40a, 40b. A detent is formed to trap the leg 34 therein (see FIG. 4b). More specifically, to proceed into position in the slot 38, the leg 34 is forced inwardly such that it deforms the resilient inserts 40a, 40b and passes therethrough with snap action. The inserts 40a, 40b then reset to their normal shape. As should be appreciated, once it passes the inserts 40a, 40b, the leg 34 cannot independently, and thus inadvertently, cause the necessary deformation to exit the slot. Thus, the combination of slot 34 and inserts 40a, 40b serve to securely hold the leg 34 on all sides, thereby preventing the crosspiece 32 from being released in response to vibrations or jarring. In effect, the crosspiece cannot be unseated from the opposed retention holes 36a, 36b. This ensures that the T-shaped retainer 30 remains in place against the adjacent second end 22 of the coupler 20. In combination with the engagement of the first end against the stop 28 in the first recess 16, a more reliable coupling assembly 10 is formed.

As is best shown in FIGS. 3a and 3b, the inserts 40a, 40b include a resilient material, such as urethane rubber or the like. These inserts are selectively compressible to provide a greater or lesser holding force/frictional resistance for preventing release of the leg 34 from the slot 38. More specifically, washers 52a, 52b disposed on either side of the tube-like inserts 40a, 40b are secured together by an adjustable means, such as a bolt/nut combination 54. The inserts 40a, 40b are cylindrical, so as to be generally rounded. They fit in the opposed C-shaped sockets (not numbered) integrally formed by casting in the upper/lower edges defining the slot 38.

Upon tightening the nut along the threads of bolt, the plates 52a, 52b are pulled together such that a compressive force is applied to the resilient insert (see horizontal action arrows in FIG. 3b). This force causes the insert to expand outwardly in a radial direction (see vertical action arrows in FIG. 3b). This expansion advantageously serves to both secure the inserts 40a, 40b in the sockets and to cause the exposed segment of the insert to bulge through the socket. These rounded bulges of the opposed inserts 40a, 40b form the detent, which prevents the leg 34 from being inadvertently released from the slot 34.

As should now be appreciated, the adjustment means 54 allow for the compressive force to be increased to further enhance the holding capabilities of the inserts 40a, 40b; that is, an increase in the amount of the insert which bulges through the opening in the C-shaped socket. Moreover, as the inserts 40a, 40b wear, increasing the compressive force advantageously expands the insert to maintain the desired holding function. If the inserts should become excessively worn or damaged they are easily removed for replacement with new inserts. This is accomplished by using the adjustment means 54 to relieve the compressive force and slide the inserts 40a, 40b from their respective sockets. This avoids requiring extensive, and thus expensive, repairs to re-establish the locking function, as is characteristic of the prior art designs noted above.

As best shown in FIG. 4a, in the locked position, the end of leg 34 extends outwardly from the side of the slot 38 and is, thus, readily accessible by the operator, and can be easily removed without tools. To remove the retainer 30 from the recess 18, the above-described installation process is reversed. More specifically, the extended end of the leg 34 is grasped and forced by rotation back through the restricted mouth of the slot 38 formed by the resilient inserts 40a, 40b, which deform to allow its passage. Maintaining the grip on the leg 34, the crosspiece 32 is lifted until it extends through the open end of the upper retention hole 36a. The retainer 30 is then released from its seated position in the lower retention hole 36b and the crosspiece 32 pivoted angularly outwardly until it can be removed from the recess. Once the retainer 30 is free of the recess 18, the second end of the coupler 20 is free to swing outwardly. Then, the first end can be pulled from behind the stop 28 and out of the first recess 16.

In the preferred embodiment, the T-shaped retainer or T-rod 30 is formed of steel dowel stock that is heat treated for hardness and, thus is not only durable, but relatively easy and inexpensive to produce. The typical sigma side sections of the pans 12, 14 are preferably cast steel, with the restricted slot 38 and the C-shaped sockets 42a, 42b being preferably formed during the casting operation.

Figure 4B:
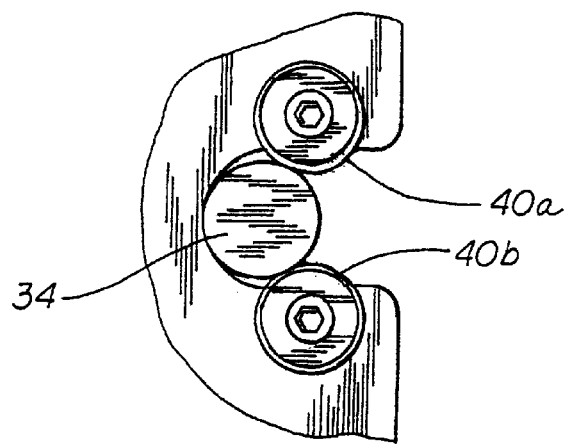
FIG. 4b is an enlarged cutaway side view from line 4b—4b of FIG. 4a showing the resilient inserts holding the locking leg in the slot.

In summary, numerous benefits have been described which result from employing the concepts of the present invention. The improved coupler assembly 10 for the pans 12, 14 in a conveyor system for handling coal or the like is provided. The dog-bone coupler 20 has first and second ends 26 that serve to secure the pans 12, 14 together so as to allow a limited degree of relative up-and-down movement between the pans, but to prevent separation. The first end is held in place by the stop 28 in the first recess 16 formed in one conveyor pan 12. In the mating pan 14, the opposite or second end of the coupler 30 is received (FIG. 1). The T-shaped retainer 30 includes the crosspiece 32, which is pivotally received in upper and lower retention holes 36*a*, 36*b*. The cross piece extends across the second end to retain it in place (FIG. 2*a*). The retainer 30 rotates such that the leg 34 projecting outwardly therefrom is received in the slot 38 (FIGS. 2*b* and 4*a*). Opposed resilient inserts 40*a*, 40*b* hold the leg 34 and, thus, the retainer 30 securely in place (FIGS. 4*a* and 4*b*). The leg 24 can be manually released from the slot 38, and the retainer 30 and the coupler 20 easily removed. Furthermore, the inserts 40*a*, 40*b* are easily removed for replacement and are adjustable to change the holding force against the leg 34 of retainer 30, such as to compensate for wear.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A conveyor system for handling coal or the like having first and second conveyor pans, each having a cooperating recess formed therein adapted to mate with each other when the pans are placed in an end-to-end relationship, a conveyor pan coupling assembly comprising:

an elongated coupler having first and second ends for insertion in and spanning between the cooperating first and second recesses;

a stop formed in the first recess for receiving and securing the first end of said coupler in place;

a T-shaped retainer having an upstanding crosspiece and a leg projecting outwardly therefrom, said crosspiece insertable in the second recess and extending across the second end of said coupler; and means for resiliently securing said leg;

whereby said coupler is retained in the cooperating recesses for coupling the first and second pans together to form said conveyor system.

2. The conveyor system of claim 1, wherein said coupler is provided with enlarged ends forming a dog-bone shape and with said ends being notched to cooperate with said stop and said retainer.

3. The conveyor system of claim 2, wherein the recess in the first pan includes upper and lower retention holes for pivotally receiving and holding said crosspiece in position against the adjacent notched end to retain the same.

4. The conveyor system of claim 3, wherein the second recess further includes a slot having a restriction in alignment with said leg; whereby upon rotation of said T-shaped retainer, said leg is received and releasably secured.

5. The conveyor system of claim 4, wherein said slot includes upper and lower resilient inserts to provide the restriction for securing said leg.

6. The conveyor system of claim 5, wherein said resilient inserts are adjustable to vary the restriction.

7. The conveyor system of claim 6, wherein said inserts are round and are seated in C-shaped sockets along the edges forming said slot.

8. In a conveyor system for handling coal or the like including mating first and second conveyor pans, a coupling assembly comprising:

an elongated coupler having spaced first and second ends;

a first recess in said first conveyor pan for receiving one end of said coupler, said recess having a stop formed therein for securing said end in said recess;

a second recess in said second conveyor pan for receiving the second end of said coupler, said recess having opposed upper and lower retention holes and a slot formed therein;

resilient means forming a restriction across said slot; and a T-shaped retainer having a crosspiece extending across said second end and a locking leg projecting outwardly therefrom, said crosspiece pivotally placed and held in said retention holes and rotatable such that said leg is releasably secured in said slot, whereby the first and second pans are releasably coupled together to form said conveyor system.

9. The coupling assembly of claim 8, wherein said resilient means comprises upper and lower resilient inserts to provide a restriction for securing said leg.

10. The coupling assembly of claim 8, wherein said coupler is provided with enlarged ends forming a dog-bone shape and with said ends being notched to cooperate with said stop and said retainer.

* * * * *